(12) United States Patent
Rephlo et al.

(10) Patent No.: US 10,713,733 B2
(45) Date of Patent: **\*Jul. 14, 2020**

(54) SYSTEM AND METHOD FOR ACCOUNT TRANSACTION AND BALANCE PREDICTION

(71) Applicant: Capital One Services, LLC, McLean, VA (US)

(72) Inventors: Jeremy D. Rephlo, Washington, DC (US); Daniel L. Struble, Newark, DE (US); Mohamed Lafeer, Fairfax, VA (US); Robert D. Rowley, Garnet Valley, PA (US); Nondini A. Naqui, Philadelphia, PA (US); Sarah Calandro, Austin, TX (US); Colin Hart, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,061

(22) Filed: Oct. 29, 2018

(65) Prior Publication Data

US 2019/0066229 A1 Feb. 28, 2019

Related U.S. Application Data

(63) Continuation of application No. 14/601,631, filed on Jan. 21, 2015, now Pat. No. 10,115,166.

(Continued)

(51) Int. Cl.
*G06Q 10/00* (2012.01)
*G06N 99/00* (2019.01)
(Continued)

(52) U.S. Cl.
CPC .............. *G06Q 40/12* (2013.12); *G06N 20/00* (2019.01)

(58) Field of Classification Search
CPC .......................... G06N 99/005; G06Q 40/12
See application file for complete search history.

(56) References Cited

U.S. PATENT DOCUMENTS

| 7,533,038 B2 * | 5/2009 | Blume | G06Q 30/02 |
| | | | 705/7.31 |
| 8,073,790 B2 * | 12/2011 | Soetjahja | G06N 3/126 |
| | | | 706/13 |

(Continued)

*Primary Examiner* — Talia F Crawley
(74) *Attorney, Agent, or Firm* — Troutman Sanders LLP; Christopher J. Forstner; John A. Morrissett

(57) ABSTRACT

A system includes a financial data storage that stores internal account data, external account data, and transaction data, a communications interface configured to receive external account data from an external data source and transaction data from a merchant, and a database manager that cooperates with the communications interface to store the external account data and the transaction data. The system also includes an account balance prediction processor configured to identify recurring expense transaction(s) and recurring income transaction(s) and update them based on user input, determine predicted expense transaction(s) and a predictive income using a predictive model, and calculate a predicted account balance. The system also includes a transaction monitor configured to compare one or more actual expense transactions with one or more predicted expense transactions, and an alert transmitter configure to generate and transmit one or more alerts based on the comparison.

20 Claims, 4 Drawing Sheets

Related U.S. Application Data

(60) Provisional application No. 61/929,608, filed on Jan. 21, 2014.

(51) Int. Cl.
  *G06Q 40/00* (2012.01)
  *G06N 20/00* (2019.01)

(56) References Cited

U.S. PATENT DOCUMENTS

| | | | | |
|---|---|---|---|---|
| 9,336,494 B1* | 5/2016 | Purpura | ............... | G06N 20/00 |
| 2002/0161677 A1* | 10/2002 | Zumbach | ............... | G06Q 40/00 |
| | | | | 705/35 |
| 2007/0244741 A1* | 10/2007 | Blume | ............... | G06Q 30/02 |
| | | | | 705/7.31 |
| 2007/0262137 A1* | 11/2007 | Brown | ............... | G06Q 20/10 |
| | | | | 235/380 |
| 2008/0215457 A1* | 9/2008 | Pappas | ............... | G06Q 10/00 |
| | | | | 705/26.8 |
| 2008/0215495 A1* | 9/2008 | Pappas | ............... | G06Q 30/0283 |
| | | | | 705/80 |
| 2009/0043779 A1* | 2/2009 | Hentrich, Jr. | ............... | G06F 16/951 |
| 2010/0217701 A1* | 8/2010 | Mesilaty | ............... | G06Q 40/00 |
| | | | | 705/35 |
| 2011/0295731 A1* | 12/2011 | Waldron, III | ............... | G06Q 10/0635 |
| | | | | 705/35 |
| 2011/0301986 A1* | 12/2011 | Pappas | ............... | G06Q 10/02 |
| | | | | 705/6 |
| 2011/0307279 A1* | 12/2011 | Pappas | ............... | G06Q 10/00 |
| | | | | 705/5 |
| 2011/0307374 A1* | 12/2011 | Grundner | ............... | G06Q 20/10 |
| | | | | 705/39 |
| 2014/0180962 A1* | 6/2014 | Fiala | ............... | G06Q 40/06 |
| | | | | 705/36 R |
| 2015/0081482 A1* | 3/2015 | Brereton | ............... | G06Q 40/12 |
| | | | | 705/30 |

* cited by examiner

SYSTEM AND METHOD FOR ACCOUNT TRANSACTION AND BALANCE PREDICTION

CROSS-REFERENCE TO RELATED APPLICATIONS

This application is a continuation of U.S. patent application Ser. No. 14/601,631, filed Jan. 21, 2015, which claims the benefit of priority to U.S. Provisional Patent Application No. 61/929,608, filed on Jan. 21, 2014, the entire contents of which is incorporated herein by reference.

FIELD

The present disclosure relates to computer systems and methods for account transaction balance prediction for an account held with a financial institution based on past and present account activity.

BACKGROUND

Current methods and systems for account transaction and balance prediction includes significant efforts by account holders. For example, an account holder may wish to understand what the balance of an account may be once all financial obligations, such as upcoming bills, and other account activity including all upcoming debits and credits are factored into the account balance for a particular period, such as a pay period. In order to accomplish this, an account holder may factor in known activity (such as a mortgage payment) and estimates or guesses associated with other account transactions. However, these calculations and estimates may not take into account all previous account transactions and activity to provide an accurate representation of a future account balance or account transactions. These and other drawbacks exist.

SUMMARY

According to the various embodiments of the present disclosure, various sets of data may be received at a financial institution system, such as external account data, internal account data, transaction data, and the like. The sets of data may be associated with a particular transaction date, due date, vendor, account number, and/or account holder. The financial institution system may aggregate and analyze the sets of data to determine a future balance associated with an account based on financial obligations such as, for example, external account bills coming due, internal account bills coming due, known vendor transactions that may repeat daily, weekly, biweekly, monthly, semi-annually, or annually, estimated vendor transactions, seasonal transaction trends, and the like. The financial institution system may then transmit the determined future balance, which may alert an account holder of the total disposable income available during a certain period, such as a pay period, a month, or a year.

In various embodiments a system includes a financial data storage that stores internal account data, external account data, and transaction data, a communications interface that receives, via a network, external account data from an external data source and transaction data from a merchant, a database manager that cooperates with the communications interface to store the received external account data in the financial data storage and the received transaction data from the merchant, an account balance prediction processor that determines a recurring financial transaction based on at least one of: the internal account data, the external account data, and the transaction data, determines recurring income data based on at least one of: the internal account data and the external account data, determines a predicted financial transaction using a predictive model based on the at least one recurring financial transaction, a prediction time period, and at least one trending data, determines a predicted income using a predictive model based on the recurring income data and the prediction time period, and calculates a predicted account balance based on the total predicted financial transactions and the predicted income, a transaction monitor that receives actual financial transaction data and actual income data, compares the actual financial transaction data with the predicted financial transaction, and compares the actual income data with the predicted income data, an alert transmitter that transmits, via a network in cooperation with the communications interface, an alert to an account holder based on the comparison.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION

Figure 1:
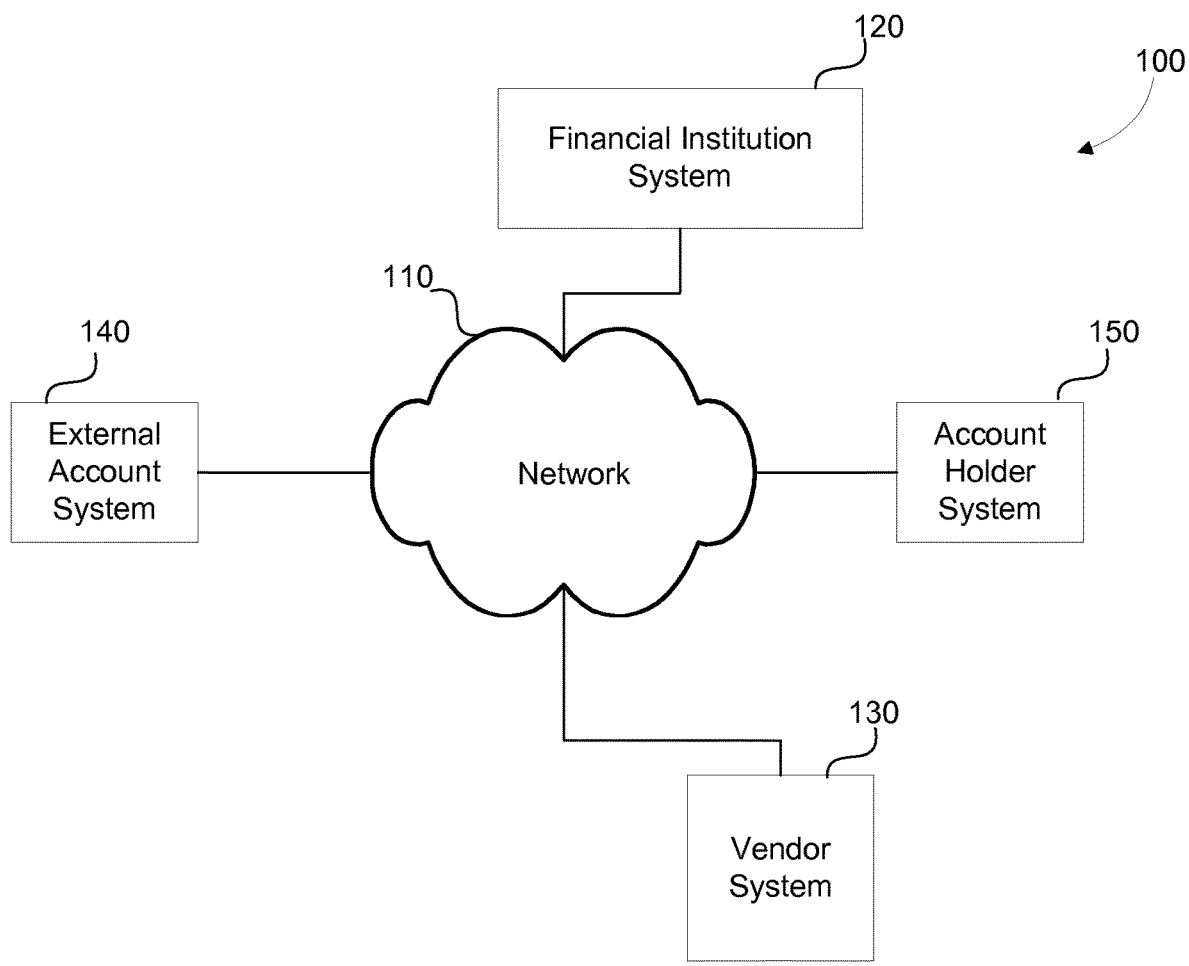
FIG. 1 depicts an example embodiment of a system for transaction and balance prediction according to an embodiment of the disclosure.

The owing description is intended to convey a thorough understanding of the embodiments described by providing a number of specific example embodiments and details involving computer systems and methods for financial transactions, income, and balance prediction based on past and present account activity. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A vendor, financial institution, account holder, and/or a third party, and system supporting a connection between vendors, financial institutions, account holders, and/or third parties, are used as examples for the disclosure. The disclosure is not intended to be limited to vendors, financial institutions, account holders, and third parties only.

The example embodiments disclosed herein are directed to computer systems and methods for transaction and balance prediction based on past and present account activity using external and internal data sources, and the like.

According to the various embodiments of the present disclosure, a financial institution may receive account holder data, internal account data, external account data, and/or transaction data over a network via a provider. The financial institution may also receive seasonal trend data, geographical trend data, and/or demographic trend data over a network via a provider.

Account holder data may include, for example, an account holder's name, address, phone number, and/or other demographic data, an account number linked with the account holder, an employer name, address, phone number, and the like. Internal account data may include, for example, internal account number, account balance, interest rates, annual percentage rates ("APR"), account fees, previous transactions, previous debits, previous credits, monthly account statements, bill pay data, pending transaction, pending debits, and/or pending credits. External account data may include, external account institution, external account number, account balance, interest rates, annual percentage rates ("APR"), account fees, previous transactions, previous debits, such as transactions, previous credits, such as payments or other credits, bill pay data, monthly account statements, pending transaction, pending debits, and/or pending credits. Transaction data may include, transaction amount, transaction date, vendor, account used in transaction, account data (such as internal or external account data), and/or any rewards or deals associated with the transaction.

Seasonal trend data, geographical trend data, and/or demographic trend may include both account holder-specific data and general data relating to seasonal, geographical, demographic trend data. For example, seasonal trend data may include both seasonal trend data specific to the account holder (such as, for example, previous year transaction data associated with shopping during the month of December) and general seasonal trend data (such as, for example, sales and profit forecasts issued by vendors and/or expert analysis associated with a holiday shopping season and/or the price of gas). Geographic trend data may include account holder specific geographic trend data (such as, for example, previous heating or air-conditioning transaction data for the account holder during a particular period) or general geographic trend data (such as average heating or air conditioning transaction data for a particular geographic location. By way of example, geographic trend data may also include data about the local price of gas, electricity, and/or other energy sources. Also, demographic trend data may be account holder specific (such as account holder entertainment-associated spending for a particular period when the account holder's income is at a certain level) or general demographic trend data (such as healthcare spending associated with a particular gender and age). Seasonal trend data, geographical trend data and/or demographic trend data may be obtained via a third party system, such as, for example, a weather services provider system, an insurance provider system, an energy provider system, and the like. A list of recurring transactions may be identified and generated by the financial institution system and/or manually identified and generated by an account holder.

Once all data is received at the financial institution, the financial institution may begin to determine future financial transactions, income data, and a future account balance associated with the account holder based on the received data. The future financial transaction, income data, and account balance may be based on at least a list of determined recurring financial transactions and/or external account payments and a list of determined recurring income associated with the account holder. A list of recurring financial transactions, external account payments, and/or income may be determined based on the received internal account data, external account data, and/or transaction data. A determined list of recurring financial transactions, external account payments, and/or income may be applied to a current internal account balance to determine a future account balance and/or an amount of disposable income associated with the internal account.

The list of recurring financial transactions, external account payments, and/or income may be altered by applying a variety of factors, such as a seasonal trend factor, a geographic trend factor, and/or a demographic trend factor. A seasonal trend factor may be calculated based on the received seasonal trend data. Similarly, a geographic trend factor and/or a demographic trend factor may be calculated based on the received geographic trend data and/or demographic trend data, respectively. For example, a seasonal trend factor may be calculated for a particular vendor, such as a water utility vendor. A seasonal trend factor may be calculated, for example, based on machine learning or a moving average of water utility bills associated with the particular account holder for a particular season and/or water utility bills associated with water utility customers in the same geographic area as the account holder, or water utility bills associated with water utility customers maintaining a similar property size as the account holder. Similarly, geographic trend factors and/or demographic trend factors may be calculated based on machine learning or a moving average associated with transactions and/or external account activity that may be affected by a geographic or demographic characteristic associated with the account holder. For example, account holders in a particular geographic area may see a certain trend in electricity vendor spending. Moreover, account holders in a particular demographic may see trends in healthcare spending. In this manner, bills, transactions, external account data, or internal account data that may vary from time to time may be properly accounted for when predicting transactions and a balance for an account.

Once a financial institution system receives all account holder data, internal account data, external account data, transaction data, income data, seasonal trend data, geographical trend data, and/or demographic trend data, the method for financial transaction, income, and balance prediction may begin. The financial institution system may begin by asking the account holder to verify previous internal account data, external account data, and transaction data. The financial institution system may determine, based on the internal account data, external account data, and transaction data, possible recurring debits and credits to an internal account. The financial institution may detect possible recurring debits and/or credits by vendor name. For example, where a water utility company appears in the transaction data, the financial institution may determine that transaction data indicates a recurring payment. Also, where an account holder has a recurring minimum credit card payment, the financial institution system may determine that transaction data indicates a recurring payment. A recurring transaction may be detected by analyzing a frequency of payments to a vendor. This analysis may include a statistical analysis and/or machine learning in order to determine whether a transaction is a recurring transaction. According, the financial institution may present a predetermined list of credits and/or debits to the account holder for verification that the credits and/or debits are recurring.

The financial institution may continuously present potential recurring credits and/or debits as they appear for an account holder. For example, where an account holder receives a bill from a cable company that has not been previously detected as a recurring payment, the financial institution may alert the account holder that a cable bill has been added and/or will be added as a recurring financial transaction for the account holder. The financial institution system also may determine that a minimum payment to a credit card, for example, may be added as a recurring payment. The account holder may then verify whether the credit and/or debit is associated with a recurring credit and/or debit.

The account holder may also select from the predetermined list, or from the internal account data, external account data, or transaction data, whether internal account data, external account data, and/or transaction data includes a one-time transaction, or if the data is indicative of a recurring debit or credit to the internal account. The account holder may also be able to set the frequency with which each recurring payment occurs. For example, the financial institution system may determine a house-cleaning recurring payment and the account holder may set the frequency to 2 weeks. The account holder may also select to set aside a selected amount for another account associated with the account holder, such as a savings account or an investment account. Moreover, the account holder may be able to select a frequency associated with the selected amount to set aside.

An account holder also may select for the financial institution to predict non-bill spend based transactions, such as grocery-related transactions, entertainment-related transactions, clothing-related transactions, and the like. In order to make these predictions, the financial institution may utilize trend data, account holder data, internal account data, external account data, and/or transaction data to predict spending associated with non-bill transactions. The financial account may then take this non-bill spend amount into consideration as a recurring financial transaction for the account holder.

Where the account holder is a new account holder, or has a change in employment, address, income, marital status, living situation, and/or other life change, the account holder may be able to select from a list of possible recurring transactions that may apply to the account holder. For example, where an account holder moves to Texas from Alaska, the account holder may be able to select an estimated utility bill associated with other account holders in the Texas location. As another example, when the financial institution system determined a new mortgage recurring payment, the financial institution system may present additional financial transaction categories to a user for selection such as, insurance transactions. A financial institution may also prompt a user for likely missing financial transactions. In this manner, the financial institution may analyze, across a set of account holders, related or clustered financial transactions. For example, up analysis of accounts, a financial institution may discover that 90% of account holders that have a recurring cable payment also have a recurring cell phone payment. Accordingly, where an account holder has indicated a recurring cable payment but the financial institution has not discovered a recurring cell phone payment, the financial institution may prompt the account holder to select whether they also have a recurring cell phone payment, and if so, the previous amount, date, vendor, and/or frequency of billing associated with that payment.

Once the account holder has set up all recurring credits and debits associated with the internal account, the financial institution may calculate a transaction amount and/or an income amount that reflects all financial transactions and/or income data, such as recurring debits and/or credits to the account. Recurring debits, as discussed above, may include recurring bills, recurring transactions, recurring transfers, and the like. Recurring credits may include recurring income payments, for example. The financial institution may then calculate a future account balance that illustrates the amount of funding available as a disposable income for the internal account based on the calculated financial transactions and income. The calculated future account balance, income, and transactions may be calculated for a certain period, such as weekly, biweekly, the period associated with a pay period, bimonthly, and/or monthly.

After a financial institution has provided the predicted financial transactions, income, and balance to the account holder, the financial institution may compare the calculated financial transactions and/or income to actual financial transactions and/or income associated with the internal account. For example, where the financial institution calculates a utility bill transaction to be a certain amount, the financial institution may compare that predicted amount to the actual amount of the utility bill associated with that prediction. As another example, where the financial institution calculates an income payment to be a certain amount, the financial institution may compare that predicted amount to the actual amount of income associated with that prediction. Moreover, in comparing actual financial transactions and/or income with a predicted financial transaction and/or income, the financial system may match an actual financial transaction and/or income payment with a predicted financial transaction and/or income payment. Matching may occur with reference to the actual financial transaction vendor name and/or company name, transaction and/or income amount, and/or transaction and/or income date. Because the predicted financial transaction amount, income amount, income date, and/or transaction date may not exactly match the actual financial transaction amount, income amount, income date, and/or transaction date, fuzzy matching algorithms may be used to match an actual financial transaction with a predicted financial transaction.

The financial institution may alert an account holder when an actual financial transaction and/or income data exceeds or falls short of a predicted transaction. In this manner, the account holder may be alerted, for example in real time, of a change in available funds associated with the internal account. The account holder may specify in account holder data held with the financial institution, when the account holder would like to be alerted of a difference between an actual financial transaction and/or income data and a predicted financial transaction and/or income data. For example, the account holder may select to only receive an alert from the financial institution when the actual financial transaction amount exceeds the predicted financial transaction amount. The account holder also may select for the financial institution to alert the account holder whenever a match has been made to allow the account holder to review the internal account balance reflecting the actual credit or debit to the account. The financial institution system also may alert the account holder when a predicted financial transaction has not been matched within a predetermined period. For example, where a financial institution determines a recurring financial transaction for a car loan that takes place on a certain date, but does not match an actual financial transaction associated with this predicted transaction within, for example, a week of the prediction, the financial institution may alert the account holder that an obligation has not been met. In this manner, the account holder may be able to either make the payment, manually match a payment to the transaction, and/or notify the financial institution that a financial obligation does not exist any longer.

The financial institution may utilize machine learning to correct and/or adjust calculations of credits or debits, such as financial transactions and/or income, associated with the account holder upon matching a credit or debit. In this manner, the financial institution may continuously improve calculations of predicted financial transactions and/or income associated with an internal account and account balance calculations. Machine learning may include, for example, supervised learning, unsupervised learning, semi-supervised learning, transduction, reinforcement learning, and other learning algorithms. For example, machine learning algorithms may include AODE, artificial neural networking, Bayesian algorithms, case-based reasoning, decision tree algorithms, Gaussian process regression, regression analysis, fuzzy algorithms, and/or a customized machine learning algorithm including aspects of any machine learning algorithm. The financial institution may also provide a range associated with the account balance and predicted financial transactions and/or income data to illustrate a low end prediction and a high end prediction associated with the predicted transactions, income, and account balance.

Additionally, the financial institution may calculate a volatility factor of the credits and debits associated with an internal account. For example, where account holder data, internal account data, external account data, and/or transaction data indicates that an account holder has a high volatility associated with income or expenses, the financial institution may provide a volatility factor that provides confidence associated with predicted transactions, income, and account balance. The financial institution also may monitor and track spending related to the account and use that information to update predicted account balances, for example.

FIG. 1 depicts an example embodiment of the financial transaction, income, and balance prediction system 100. Financial transaction, income, and balance prediction system 100 may include various systems connected to each other over a network 110. These systems include a financial institution system 120, external account systems 140, vendor systems 130, and account holder systems 150.

The network 110 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may further include one network, or any number of exemplary types of networks mentioned above, operating as a stand-alone network or in cooperation with each other. Network 110 may utilize one or more protocols of one or more network elements to which they are communicatively couples. Network 110 may translate to or from other protocols to one or more protocols of network devices.

Although network 110 is depicted as a single network, it should be appreciated that according to one or more embodiments, network 110 may comprise a plurality of interconnected networks, such as, for example, the Internet, a service provider's network, a cable television network, corporate networks, and home networks.

A financial institution may access network 110 through one or more financial institution systems 120 that may be communicatively coupled to the network 110. A vendor may access the network 110 through one or more vendor systems 130 that may be communicatively coupled to the network 110. One or more external account systems 140 may also be communicatively coupled to the network 110. Additionally, an account holder may be communicatively coupled to the network 110 using an account holder system 150.

An example financial institution system 120, vendor system 130, external account system 140, and/or account holder system 150 may include one or more network-enabled computers to process instructions for account balance prediction using past and present data from external and internal data sources. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 100 may execute one or more software applications to perform transaction, income, and balance predictions. For example, financial institution system 120 may receive external account information from an external account system 140 over network 110.

The financial institution system 120, vendor system 130, external account system 140, and/or account holder system 150 may further include, for example, a processor, which may be several processors, a single processor, or a single device having multiple processors. The financial institution system 120, vendor system 130, external account system 140, and/or account holder system 150 may access and be communicatively coupled to the network 110. The financial institution system 120, vendor system 130, external account system 140, and/or account holder system 150 may store information in various electronic storage media, such as, for example, a database (not shown). Electronic information may be stored in the financial institution system 120, vendor system 130, external account system 140, and/or account holder system 150 in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

The financial institution system 120, vendor system 130, external account system 140, and/or account holder system 150 may send and receive data using one or more protocols. For example, data may be transmitted and received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiples Access (CDMA) based systems suitable for transmitting and receiving data. Data may be transmitted and received wirelessly or may utilize cabled network connections or telecom connections, fiber connections, traditional phone wireline connection, a cable connection, or other wired network connection.

Each financial institution system 120, vendor system 130, external account system 140, and/or account holder system 150 of FIG. 1 also may be equipped with physical media, such as, but not limited to, a compact disc (CD), a digital versatile disc (DVD), a floppy disk, a hard drive, read only memory (ROM), random access memory (RAM), as well as other physical media capable of storing software, or combinations thereof. The financial institution system 120, vendor system 130, external account system 140, and/or account holder system 150 may be able to perform the functions associated with transaction, income, and balance prediction 200 and may, for example, house the software of transaction, income, and balance prediction, obviating the need for a separate device on the network 110 to run the methods housed on the financial institution system 120, vendor system 130, external account system 140, and/or account holder system 150. Furthermore, the information stored in a database (not shown) may be available over the network 110, with the network containing data storage.

A database housed on any financial institution system 120, vendor system 130, external account system 140, and/or account holder system 150 or the network 110, may store, or may connect to external data warehouses that stores, account holder data, internal account data, external account data, and/or transaction data.

Figure 4:
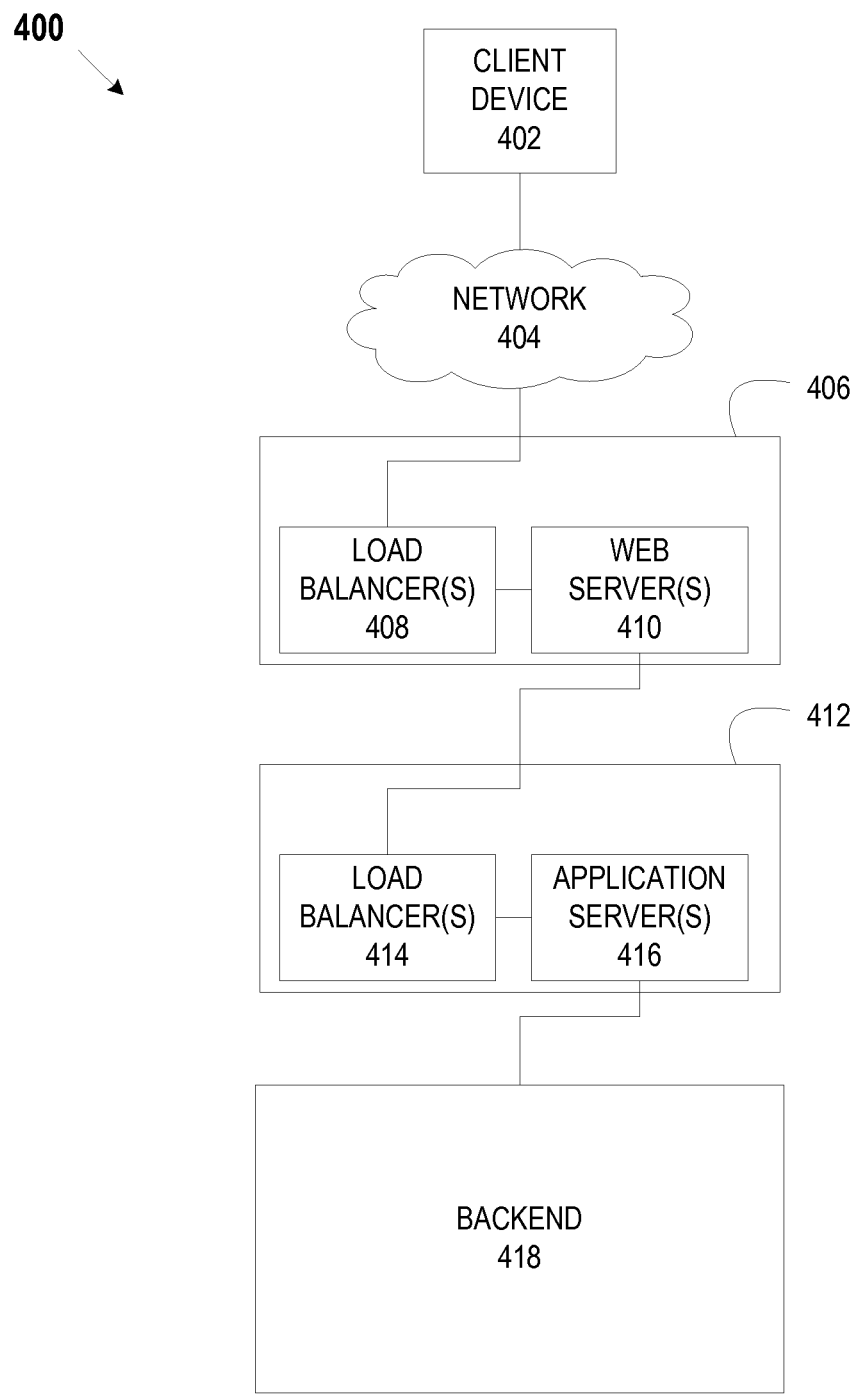
FIG. 4 depicts an example embodiment of a system for transaction and balance prediction according to an embodiment of the disclosure.

FIG. 4 depicts an example system 400 that may enable a financial institution, for example, to provide network services to its customers. For example, system 400 may enable a financial institution to interact with account holders and provide predicted balances. System 400 also may enable a financial institution to interact with external data sources and receive information relating to, for example, recurring payments. As shown in FIG. 4, system 400 may include a client device 402, a network 404, a front-end controlled domain 406, a back-end controlled domain 412, and a backend 418. Front-end controlled domain 406 may include one or more load balancers 408 and one or more web servers 410. Back-end controlled domain 412 may include one or more load balancers 414 and one or more application servers 416.

Client device 402 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 400 may execute one or more software applications to enable, for example, network communications.

Client device 402 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 404 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 404 may include, without limitation, telephone lines, fiber optics, IEEE Ethernet 902.3, a wide area network (WAN), a local area network (LAN) or a global network such as the Internet. Also, network 404 may support an Internet network, a wireless communication network, a cellular network, or the like, or any combination thereof. Network 404 may further include one network, or any number of example types of networks mentioned above, operating as a stand-alone network or in cooperation with each other. Network 404 may utilize one or more protocols of one or more network elements to which they are communicatively couples. Network 404 may translate to or from other protocols to one or more protocols of network devices. Although network 404 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 406 may be implemented to provide security for backend 418. Load balancer(s) 408 may distribute workloads across multiple computing resources, such as, for example computers, a computer cluster, network links, central processing units or disk drives. In various embodiments, load balancer(s) 410 may distribute workloads across, for example, web server(S) 416 and/or backend 418 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 408 may include software that monitoring the port where external clients, such as, for example, client device 402, connect to access various services of a financial institution, for example. Load balancer(s) 408 may forward requests to one of the application servers 416 and/or backend 418 servers, which may then reply to load balancer 408. This may allow load balancer(s) 408 to reply to client device 402 without client device 402 ever knowing about the internal separation of functions. It also may prevent client devices from contacting backend servers directly, which may have security benefits by hiding the structure of the internal network and preventing attacks on backend 418 or unrelated services running on other ports, for example.

A variety of scheduling algorithms may be used by load balancer(s) 408 to determine which backend server to send a request to. Simple algorithms may include, for example, random choice or round robin. Load balancers 408 also may account for additional factors, such as a server's reported load, recent response times, up/down status (determined by a monitoring poll of some kind), number of active connections, geographic location, capabilities, or how much traffic it has recently been assigned.

Load balancers 408 may be implemented in hardware and/or software. Load balancer(s) 408 may implement numerous features, including, without limitation: asymmetric loading; Priority activation: SSL Offload and Acceleration; Distributed Denial of Service (DDoS) attack protection; HTTP compression; TCP offloading; TCP buffering;

direct server return; health checking; HTTP caching; content filtering; HTTP security; priority queuing; rate shaping; content-aware switching; client authentication; programmatic traffic manipulation; firewall; intrusion prevention systems.

Web server(s) 410 may include hardware (e.g., one or more computers) and/or software (e.g., one or more applications) that deliver web content that can be accessed by, for example a client device (e.g., client device A 02) through a network (e.g., network 404), such as the Internet. In various examples, web servers, may deliver web pages, relating to, for example, online banking applications and the like, to clients (e.g., client device 402). Web server(s) 410 may use, for example, a hypertext transfer protocol (HTTP or sHTTP) to communicate with client device 402. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 410 may respond with the content of that resource or an error message if unable to do so. The resource may be, for example a file on stored on backend 418. Web server(s) 410 also may enable or facilitate receiving content from client device 402 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 410 can be scripted in separate files, while the actual server software remains unchanged.

Load balancers 414 may be similar to load balancers 408 as described above.

Application server(s) 416 may include hardware and/or software that is dedicated to the efficient execution of procedures (e.g., programs, routines, scripts) for supporting its applied applications. Application server(s) 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 416 may act as a set of components accessible to, for example, a financial institution or other entity implementing system 400, through an API defined by the platform itself. For Web applications, these components may be performed in, for example, the same running environment as web server(s) 410, and application servers 416 may support the construction of dynamic pages. Application server(s) 416 also may implement services, such as, for example, clustering, fail-over, and load-balancing. In various embodiments, where application server(s) 416 are Java application servers, the web server(s) 416 may behaves like an extended virtual machine for running applications, transparently handling connections to databases associated with backend 418 on one side, and, connections to the Web client (e.g., client device 402) on the other.

Backend 418 may include hardware and/or software that enables the backend services of, for example, a financial institution or other entity that maintains a distributed system similar to system 400. For example, backend 418 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 418 may be associated with various databases, including account databases that maintain, for example, customer account information, product databases that maintain information about products and services available to customers, content databases that store content associated with, for example, a financial institution, and the like. Backend 418 also may be associated with one or more servers that enable the various services provided by system 400.

Figure 2:
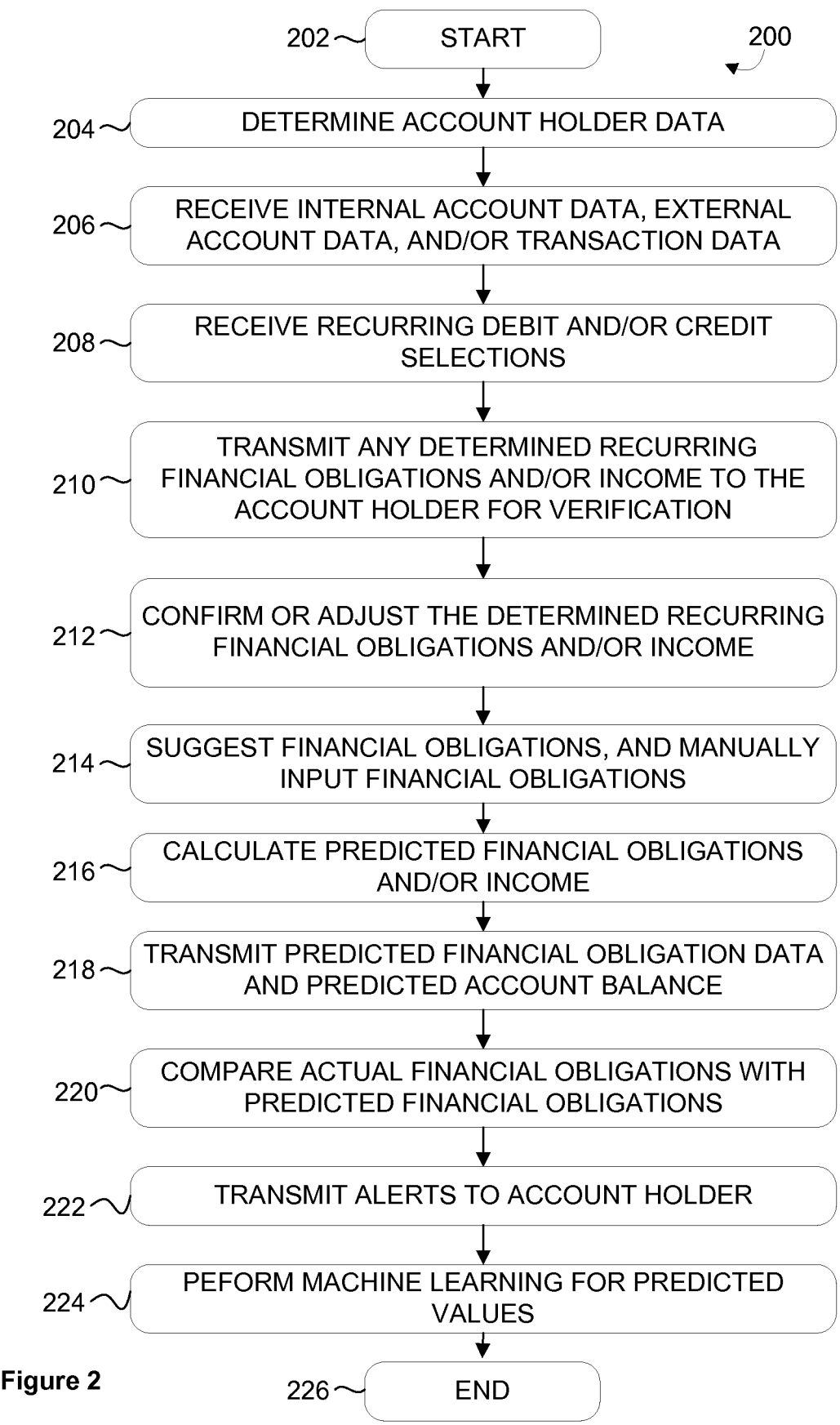
FIG. 2 depicts an example flow chart illustrating a method for transaction and balance prediction according to an embodiment of the disclosure.

Referring now to FIG. 2, FIG. 2 illustrates a transaction, income, and balance prediction method. The method 200 may start at block 202. At block 204 the financial institution may receive account holder data. The financial institution may automatically associate an internal account held at the financial institution with the account holder based, for example, on the received account holder data. At block 206, the financial institution may receive all internal account data, external account data, income data, and/or transaction data associated with the account holder. At block 208, the financial institution system may determine whether the internal account data, external account data, income data, and/or transaction data indicates any recurring financial transactions and/or income. At block 210, the system may transmit any determined recurring financial transactions and/or income to the account holder for verification. The account holder may then confirm or adjust the determined recurring financial transactions and/or income at block 212. As discussed, the financial institution may present predictive financial transactions, predictive income data, suggested financial transactions, suggested income data, manual input financial transactions, and manual input income data to an end user where an account holder may approve, deny or modify the transmitted data in block 214.

At block 216, the financial institution may calculate predicted financial transactions and/or income with the account holder's internal account. The predicted financial transactions may be calculated using machine learning, a moving average, applying trend factors, such as a seasonal trend face, a demographic trend factor, and/or a geographic trend factor. In this manner the financial institution may calculate a starting balance of the account, predicted financial transactions associated with the account, and/or a predicted balance that may take into account all predicted financial transactions. All predicted financial transactions, predicted income data, and predicted account balance based on predicted financial transactions and/or income may take into account any trend data and/or volatility associated with the account holder.

At block 218, a financial institution may transmit predicted financial transaction data, predicted income data, and/or predicted account balance based on financial transactions and/or income to an account holder. The financial institution may also transmit a range associated with the account balance and predicted financial transactions and/or income data to illustrate a low end prediction and a high end prediction associated with the predicted transactions, income, and account balance. The range and/or predicted financial transaction data and/or account data may be based on a calculated volatility factor associated with an internal account. For example, where account holder data, internal account data, external account data, income data, and/or transaction data indicates that an account holder has a high volatility associated with income or expenses, the financial institution may provide a volatility factor that provides confidence associated with the predicted transactions, income data, and account balance.

At block 220, after a financial institution has provided the predicted financial transactions, income, and/or balance to the account holder, the financial institution may compare the calculated financial transactions and/or income to actual financial transactions and/or income associated with the internal account. For example, where the financial institution calculates a utility bill transaction to be a certain amount, the financial institution will compare that predicted amount to the actual amount of the utility bill associated with that prediction. As another example, where the financial institution calculates an income payment to be a certain amount, the financial institution may compare that predicted amount to the actual amount of income associated with that prediction. Moreover, in comparing actual financial transactions and/or income data with a predicted financial transaction and/or income data, the financial system may match an actual financial transaction and/or income data with a predicted financial transaction and/or income data. Matching may occur with reference to the actual financial transaction vendor name, actual income data company name, transaction amount, income amount, income date, and/or transaction date. Because the predicted financial transaction amount, income amount, income date, and/or transaction date may not exactly match the actual financial transaction amount, income amount, income date, and/or transaction date, fuzzy matching algorithms may be used to match an actual financial transaction and/or income data with a predicted financial transaction and/or income data.

In block 222, the financial institution may alert an account holder when an actual financial transaction and/or income data exceeds and/or falls short of a predicted financial transaction and/or income data. In this manner, the account holder may be alerted of a change in predicted available funds associated with the internal account. The account holder may specify in account holder data held with the financial institution, when the account holder would like to be alerted of a difference between an actual financial transaction and/or income and a predicted financial transaction and/or income. For example, the account holder may select to only receive an alert from the financial institution when the actual financial transaction and/or income amount exceeds or falls below the predicted financial transaction and/or income amount or when the different between actual and predicted financial transaction and/or income amounts exceeds or falls below a predefined threshold. The account holder may also select for the financial institution to alert the account holder whenever a match has been made to allow the account holder to review the internal account balance reflecting the actual credit or debit to the account. A financial institution system of record (e.g., backend 418 and/or financial institution system 120) may be used to alert an account holder as described herein.

The financial institution system may also alert the account holder when a predicted financial transaction and/or income data has not been matched within a predetermined period. For example, where a financial institution determines a recurring financial transaction for a car loan that takes place on a certain date, but does not match an actual financial transaction associated with this predicted transaction within, for example, a week of the prediction, the financial institution may alert the account holder that a financial obligation may not be met. As another example, where a financial institution determines recurring income data from Company A is received at the financial institution on a certain date, but does not match actual income data associated with the predicted income data within, for example, a week of the prediction, the financial institution may alert the account holder that income data may be missing. In this manner, the account holder may be able to either make the payment, request a payment, manually match a payment and/or credit to the transaction and/or income data, and/or notify the financial institution that a financial obligation and/or income no longer exists.

At block 224, a financial institution may utilize machine learning to correct and/or adjust calculations of predicted credits or debits, such as financial transactions and/or income, associated with the account holder upon matching a predicted financial transaction and/or income with an actual financial transaction and/or income. In this manner, the financial institution may continuously improve calculations of predicted financial transactions and/or income associated with an internal account and account balance calculations.

At block 226, the method may end. The method 200 may continually reiterate at a predefined period. For example, an account holder may request that financial transaction, income, and/or balance predictions occur weekly, bimonthly, monthly, semi-annually, or any other set time period. In this manner the account holder may be continuously aware of an account balance that takes into considerations future debits and credits that are likely to be imposed on the account holder.

Figure 3A:
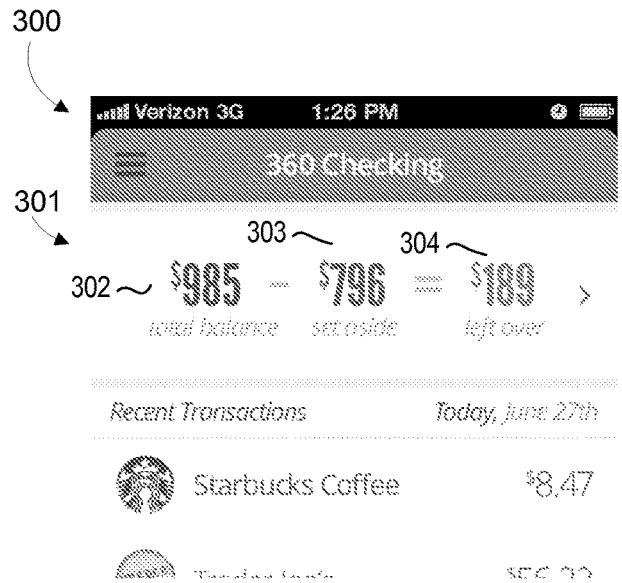
FIGS. 3A-3C depict example screen shots available for use in a method and system for transaction and balance prediction according to an embodiment of the disclosure.
Figure 3C:
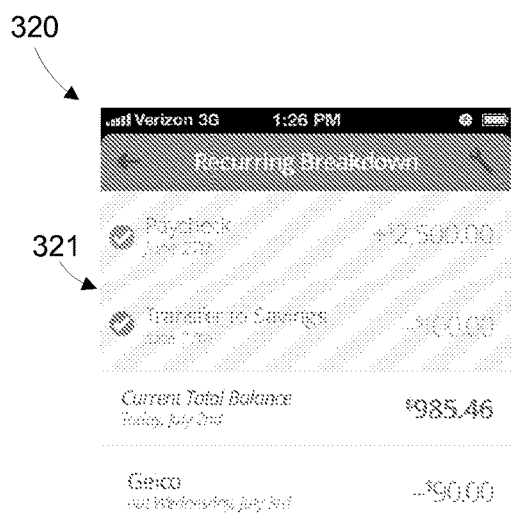
Figure 3B:
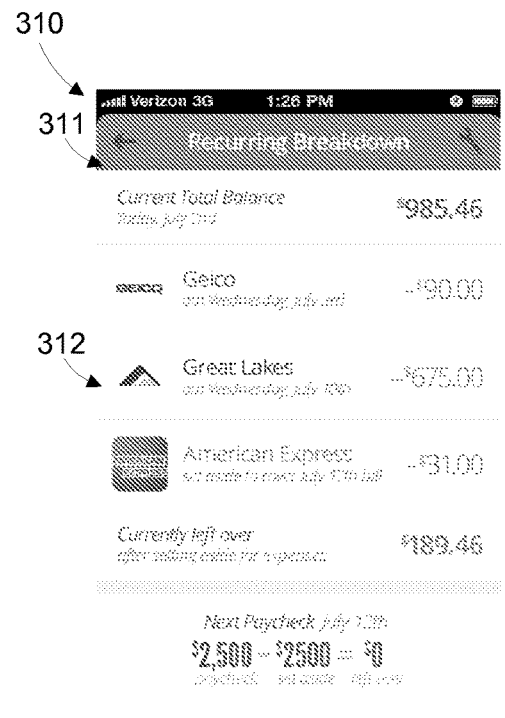

FIGS. 3A-3C illustrates example screen shots that may be presented to the account holder. For example, FIG. 3A illustrates an interface 300 displayed on a mobile device, for example. Interface 300 may indicate a total balance 301, which may be a current account balance 302, a set aside amount 303, which may include all predicted transactions, and a left over amount 304, which may include a predicted account balance after all transactions have been taken into considerations. FIG. 3B illustrates an interface 301 displayed on a mobile device, for example. Interface 310 may indicate a recurring breakdown 311 that provides the account holder with detailed information 312 for each predicted credit and/or debit transaction. FIG. 3C illustrates an example interface 320 which may be displayed on a mobile device, for example. Interface 320 illustrates predicted credits and/or debits 321 that have been matched by the financial institution as described above.

It should be appreciated that the foregoing discussion related to FIGS. 1 through 3C is illustrative only, and that the various embodiments of the invention may be implemented by any other appropriate system or method.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system comprising:
   a financial data storage that stores internal account data, external account data, and transaction data;
   a communications interface configured to receive external account data from an external data source and transaction data from a merchant;
   a database manager that cooperates with the communications interface to store the received external account data in the financial data storage and the received transaction data from the merchant;

an account balance prediction processor configured to:
  identify one or more recurring expense transactions and one or more recurring income transactions based on at least one of: the internal account data, the external account data, and the transaction data;
  receive, from an account holder mobile device associated with the account holder, user input either (i) verifying that the one or more recurring expense transactions and the one or more recurring income transactions are recurring or (ii) identifying any of the one or more recurring expense transactions and the one or more recurring income transactions that are one-time transactions;
  update the one or more recurring expense transactions and one or more recurring income transactions based on the user input;
  determine one or more predicted expense transactions using a predictive model based on the updated one or more recurring expense transactions and a prediction time period;
  determine a predicted income using the predictive model based on the updated one or more recurring income transactions and the prediction time period;
  calculate a predicted account balance based on of the one or more predicted expense transactions and the predicted income;

a transaction monitor configured to receive one or more actual expense transactions within the predicted time period, and compare the one or more actual expense transactions with the one or more predicted expense transactions; and an alert transmitter configured to generate and transmit in real time, via a network in cooperation with the communications interface, a first alert when a first predicted expense transaction of the one or more predicted expense transactions matches a first actual expense transaction of the one or more actual expense transactions, the matching based on one or more fuzzy matching algorithms, and a second alert when the first predicted expense transaction has not been matched with the one or more actual expense transactions within a predetermined time period.

2. The system of claim 1, wherein the external data source is a third party that bills the account holder on a recurring basis.

3. The system of claim 1, wherein the alert transmitter transmits the first alert and the second alert via short message service (SMS).

4. The system of claim 1 wherein the alert transmitter transmits the first alert and the second alert via email.

5. The system of claim 1, further comprising:
a native mobile application that executes on the account holder mobile device and comprises a user interface that provides the predicted account balance to the account holder.

6. The system of claim 1, wherein the alert transmitter transmits one or more of the first and second alerts via push notification.

7. The system of claim 1, wherein the financial data storage, communications interface, database manager, account balance prediction processor, transaction monitor, and alert transmitter are integrated into a backend system of a financial service provider.

8. The system of claim 1, wherein the internal account data comprises bill pay data of the account holder.

9. The system of claim 1, wherein the external account data is seasonal trend data.

10. The system of claim 1, wherein the external account data is global trend data.

11. The system of claim 1, wherein the account balance prediction processor is further configured to evaluate the internal account data, the external account data and the transaction data and apply seasonal, demographic, and geographic trend factors to calculate a volatility factor of credits and debits associated with an internal account that provides confidence associated with the predicted transactions, income data, and account balance.

12. The system of claim 1, wherein the account balance prediction processor is configured to determine the one or more predicted expense transactions using the predictive model based at least in part on at least one trending data.

13. The system of claim 1, wherein the account balance prediction processor is further configured to provide a range associated with each of the predicted account balance and predicted financial transactions and income data to illustrate a first end prediction and a second end prediction associated with each of the predicted transactions, income, and account balance, the range based on the calculated volatility factor.

14. The system of claim 1, wherein the account balance prediction processor is further configured to prompt, based on analyzing related financial transactions across a set of account holders, the account holder mobile device to receive a selection therefrom for likely missing financial transactions including whether there is a related recurring financial transaction.

15. The system of claim 1 further comprising a machine learning processor that continuously adjusts calculations of the predicted financial transactions and income.

16. A system comprising:
one or more processors; and
a memory in communication with the one or more processors and storing instructions that, when executed by the one or more processors, are configured to cause the system to:
  receive account holder data comprising internal account data, external account data, and transaction data associated with an account holder;
  identify one or more recurring expense transactions and one or more recurring income transactions based on the account holder data;
  receive, from an account holder mobile device associated with the account holder, user input either (i) verifying that the one or more recurring expense transactions and the one or more recurring income transactions are recurring or (ii) identifying any of the one or more recurring expense transactions and the one or more recurring income transactions that are one-time transactions;
  update the one or more recurring expense transactions and one or more recurring income transactions based on the user input;
  determine one or more predicted expense transactions based on the updated one or more recurring expense transactions and a prediction time period;
  determine a predicted income based on the updated one or more recurring income transactions and the prediction time period;
  receive one or more actual expense transactions within the prediction time period;
  compare the one or more actual expense transactions with the one or more predicted expense transactions;

transmit, to the account holder mobile device, a first alert when a first predicted expense transaction of the one or more predicted expense transactions matches, based on the comparison, a first actual expense transaction of the one or more actual expense transactions, the matching based on one or more fuzzy matching algorithms; and transmit, to the account holder mobile device, a second alert when the first predicted expense transaction has not been matched with the one or more actual expense transactions within a predetermined time period.

17. The system of claim 16, wherein the instructions, when executed by the one or more processors, are further configured to cause the system to determine a predicted account balance based on the one or more predicted expense transactions and the predicted income.

18. The system of claim 16, wherein the instructions, when executed by the one or more processors, are further configured to cause the system to prompt, based on analyzing related financial transactions across a set of account holders, the account holder mobile device to receive a selection therefrom for likely missing financial transactions including whether there is a related recurring financial transaction.

19. A system comprising:
one or more processors; and
a memory in communication with the one or more processors and storing instructions that, when executed by the one or more processors, are configured to cause the system to:
receive account holder data comprising internal account data, external account data, and transaction data associated with an account holder;
identify one or more recurring expense transactions and one or more recurring income transactions based on the account holder data;
update the one or more recurring expense transactions and one or more recurring income transactions based on a user input;
determine one or more predicted expense transactions based on the updated one or more recurring expense transactions and a prediction time period;
determine a predicted income based on the updated one or more recurring income transactions and the prediction time period;
receive one or more actual expense transactions within the prediction time period;
compare the one or more actual expense transactions with the one or more predicted expense transactions;
transmit, to an account holder mobile device, a first alert when a first predicted expense transaction of the one or more predicted expense transactions matches, based on the comparison, a first actual expense transaction of the one or more actual expense transactions, the matching based on one or more fuzzy matching algorithms; and
transmit, to the account holder mobile device, a second alert when the first predicted expense transaction has not been matched with the one or more actual expense transactions within a predetermined time period.

20. The system of claim 19, wherein the instructions, when executed by the one or more processors, are further configured to cause the system to receive, from the account holder mobile device associated with the account holder, the user input either (i) verifying that the one or more recurring expense transactions and the one or more recurring income transactions are recurring or (ii) identifying any of the one or more recurring expense transactions and the one or more recurring income transactions that are one-time transactions.

* * * * *